UNITED STATES PATENT OFFICE.

DANIEL SPILL, OF PARADISE TERRACE, HACKNEY, ENGLAND.

IMPROVED MODE OF PROTECTING INSULATED TELEGRAPH-WIRES.

Specification forming part of Letters Patent No. 91,378, dated June 15, 1869.

*To all whom it may concern:*

Be it known that I, DANIEL SPILL, of Paradise Terrace, Hackney, in the county of Middlesex, England, have invented certain new and useful Modes of Protecting Insulated Telegraph-Wires; and I hereby declare the following to be a full, clear, and exact description of the same.

Hitherto, when telegraphic wires have been covered or coated with gutta-percha, india-rubber, or other similar insulating materials, great injury has accrued to them either from exposure to heat, or from attrition, or from decomposition when buried in the earth, or from other circumstances.

Now, my invention consists in the application of an external coating for the protection of telegraphic wires which have been previously insulated or coated, either by means of gutta-percha or otherwise, such protecting coating or covering being composed either entirely or in part of compounds or combinations consisting, essentially, of xyloidine, in conjunction with non-volatile solvents, oils, resins, tar, asphalt, pigments, or other similar bodies.

I employ a combination of xyloidine with tar-oils, gutta-percha, tar, or paraffine, which is produced by the employment of non-volatile solvents, these combinations being fully described in the specification of the invention of Daniel Spill, for which he is now also making application for a patent.

The plastic material or combination, having been prepared by any of the methods therein described, may be operated upon in a wire-coating apparatus, such as has been before referred to, and the previously coated or covered wires may thus be coated or covered with the protecting material.

I am aware that it has been proposed to employ a solution of gun-cotton in a volatile solvent for the varnishing of telegraphic wires which have been previously coated with an insulating material; but my invention differs therefrom in that I employ a plastic mass composed of the ingredients such as are hereinbefore mentioned, and in a manner similar to that now adopted for the coating or covering of telegraphic wires by means of gutta-percha.

What I wish to secure as my invention is—

The coating and protecting of telegraphic wires, which have been previously coated or covered with an insulating material, with any of the compounds or combinations hereinbefore referred to, or with other similar compounds, they having as part of their constituents xyloidine or gun-cotton, in conjunction with a non-volatile solvent, and they being applied in a manner as hereinbefore described.

In testimony whereof I have signed my name to this specification in the presence of two subscribing witnesses.

DANIEL SPILL.

Witnesses:
   THOMAS I. BYRNE,
      47 *Lincoln's Inn Fields.*
   RUDOLPH CHAS. NICKOC.
      10 *Birchin Lane, London.*